J. B. SLAWSON.
Ventilators for Lamp Chambers of a Fare-Box.
No. 153,383. Patented July 21, 1874.
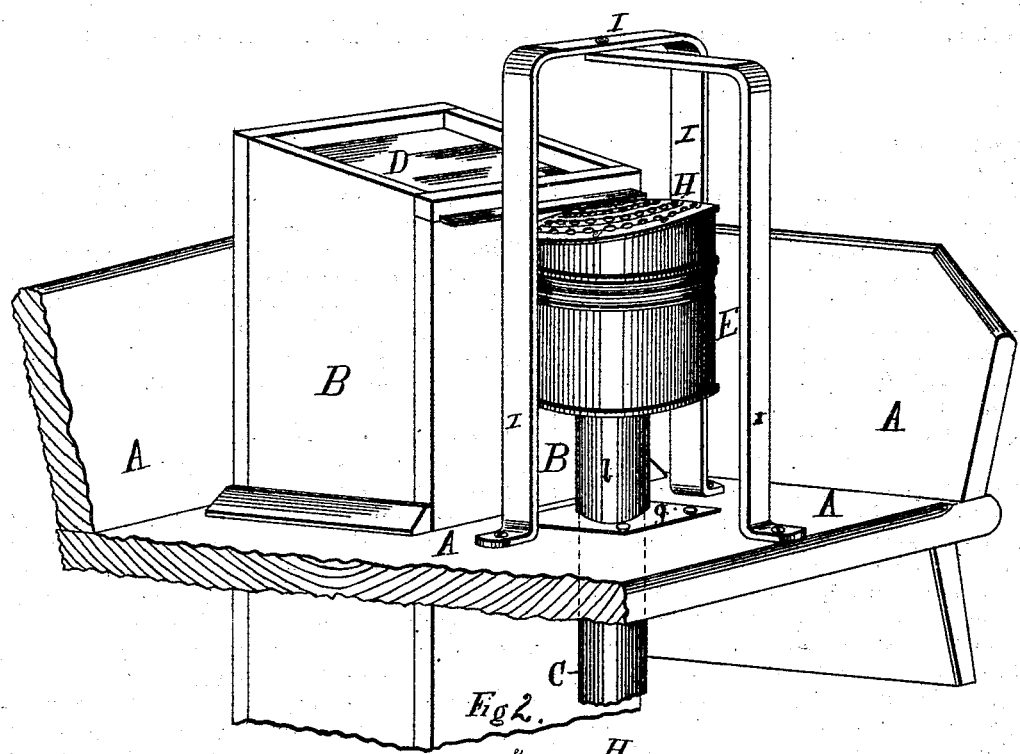
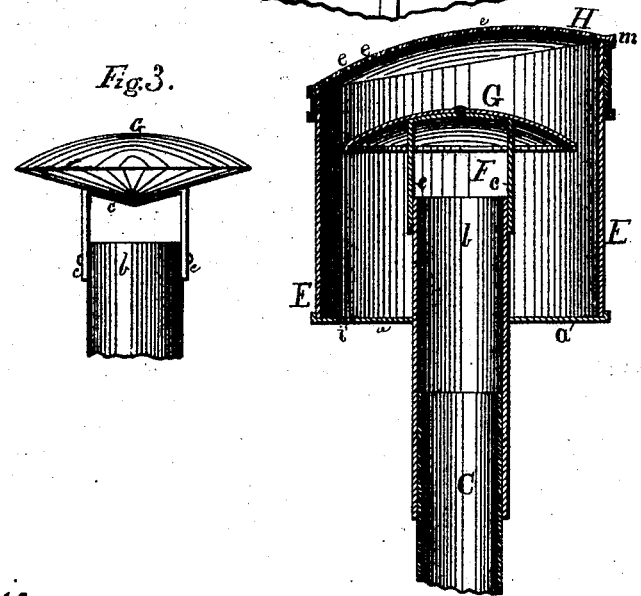
Witnesses.
D. G. Stuart
Lu Van Renwick
Inventor.
John B. Slawson
per D. Hannay atty.

UNITED STATES PATENT OFFICE.

JOHN B. SLAWSON, OF NEW YORK, N. Y.

IMPROVEMENT IN VENTILATORS FOR LAMP-CHAMBERS OF FARE-BOXES.

Specification forming part of Letters Patent No. 153,383, dated July 21, 1874; application filed June 19, 1874.

*To all whom it may concern:*

Be it known that I, JOHN B. SLAWSON, of New York, in the county of New York and State of New York, have invented certain new and useful Improvements in Ventilators for the Lamp-Chamber of Omnibus Fare-Boxes; and I do hereby declare the following to be a full, clear, and exact description of the invention, such as will enable others skilled in the art to which it pertains to make and use it, reference being had to the accompanying drawings, which form part of this specification.

Figure 1 represents a view, in perspective, of a detached portion of the driver's seat of an omnibus, showing the method of applying my improved ventilator attachment to the top of the chimney of the fare-box lamp-chamber, as also the guard-frame which protects it from becoming smothered up by the driver's blanket or coat, or from accidents or unintentional displacement or injury by the driver, and showing at the same time the relation of the top of the fare-box and ventilator with respect to the seat. Fig. 2 represents a vertical section of the ventilator and portion of the lamp-chamber chimney, showing details of construction; and Fig. 3, a detached view, in elevation and partial section, of a modified form of the deflector which covers or protects the mouth of the chimney and of its connections.

Heretofore much difficulty has been experienced in providing the lamp-chamber of omnibus fare-boxes with proper facilities for effectually carrying off the products of combustion of the candle or lamp used in lighting up the fare-box, for the reason that if perfectly free ventilation is given the surging of the omnibus in crossing the gutters, or in riding over other inequalities of the street, suddenly forces a current of air down the chimney, which frequently extinguishes the light, thereby giving great and unnecessary trouble to the driver in relighting it, and failing which he cannot collect the fare and examine it as to its genuineness or correctness in amount, to the great detriment of the proprietors.

To provide the chimney with an apparatus which, while it insures free and perfect ventilation for the voiding of the products of combustion, yet which will prevent the forcible downward passage of the air so as to extinguish the light, is the object of this invention; and it consists in providing the chimney-top with a ventilating apparatus of peculiar construction, and with a suitable guard-frame, through which to protect it from injury, and at the same time prevent its outlet from being so covered up by the driver's blanket or cloak as to be smothered or choked up.

To enable others skilled in the art to make, construct, and use my invention, I will now proceed to describe its parts in detail, omitting a particular description of such parts of the omnibus and fare-box as are non-essential to a full understanding of my present improvement, here premising that the invention is susceptible of being applied to any kind of omnibus fare-box which is provided with a lamp-chamber for the illumination of the fare when arrested for inspection by the driver.

In the drawings, Fig. 1, the left-hand end of the driver's seat A is represented as being broken off, along with the upper end of the fare-box B and chimney C of the lamp-chamber, from the top of the omnibus. The seat itself is made and attached to the omnibus in the usual manner, with the exception that the upper end of the fare-box B and chimney C is made to project through it, as shown in Fig. 1, and suitably secured thereto. The box B here represented is of that class in which a glass, D, is inserted in its top, through which the driver looks into its interior, in order to inspect the fare as deposited by the passengers when arrested on the platform or other device suitably arranged for this purpose, such as that shown in the patent granted to William H. Young, June 21, 1870, and subsequently sold and assigned to me. Within a short distance of the front side of this box B the upper end of the chimney C is also passed through the seat, the lower end of which communicates with the top of the lamp-chamber proper of the fare-box. Over that portion of the chimney which projects above the seat is fitted the tubular end of the ventilator E proper. This ventilator consists of an inclosed chamber, F, of suitable form, by preference circular, into the bottom *a* of which is fitted a tube, *b*, of an internal diameter sufficient to fit over the exterior of the chimney C. The upper end of tube *b* is made to project for a considerable distance above the bottom of the chamber F, as shown at Fig. 2, and has the ends *c c* of a bent piece of sheet metal secured thereto, in any suitable manner, either on its inside or outside, but by preference the latter. To the middle of this bent piece *c* is secured a circular deflector or cap-piece, G, of convex form on its upper side and concave on its under side, as shown in Fig. 2, or, what may be better, convex on both sides, as shown in Fig. 3. This cap-piece is made to project some distance beyond the outer periphery of the tube *b*, so as to prevent the passage of air from above down the chimney C, by deflecting it from the latter toward the sides of the chamber F. By making the under side of cap-piece G of convex form it will give a freer passage upward to the products of combustion of the lamp as they issue from chimney C through tube *b*, and that without materially increasing the liability of the external air to force a passage downward to the lamp through chimney C. The top of chamber F is covered by a roof or cap, H, which is perforated with a number of small holes, *e*, through which the heated gases of the lamp find their way to the outer air. This roof may be secured permanently to the top of the wall E of the chamber F, if desired; but for some reasons it may be made removable, as shown in the drawings. The upper end of the wall of the chamber F is made higher on one side than on its opposite side, and cap H is correspondingly made, as shown in Figs. 1 and 2, for a purpose to be hereafter alluded to. The bottom *a* of chamber F is also provided with a number of small openings, *i*. These openings are for the purpose of voiding any water which in rainy weather may find entrance into chamber F through the apertures *e* in the top H. A small plate of metal, *g*, closely encircles the upper end of chimney C, and is then secured by screws, or small nails or tacks, to the seat, either above or below the latter. This serves to steady the top of the chimney and keep it firmly in place. The ventilator is thus made: The lower end of its tube *b* is forced over the upper end of chimney C in such manner that the high side *m* of the upper end of chamber F shall be in front and the low side next fare-box B. By this arrangement, as the omnibus surges forward, the high front *m* prevents a sudden forcing of a current of air through the small openings *e* in the top H of the ventilator, and consequent tendency to extinguish the light. Immediately over the ventilator is arranged an iron guard-frame, I, consisting of two or more strips of metal bent into suitable form and riveted together, the feet of which are firmly secured to the top of the seat. The top of this frame is raised sufficiently high above the ventilator to give free passage to the gases from the lamp-chamber, even when the driver's coat or blanket should inadvertently happen to be thrown over it, and is made sufficiently strong to protect the ventilator from injury from accidental causes to which it would otherwise be liable. The frame may be provided with such number of legs as may be deemed necessary, but in practice three seem to be amply sufficient.

Having thus described my improvement, what I claim as new, and desire to secure by Letters Patent, is—

1. A ventilating apparatus consisting of a chamber, F, connecting-tube *b*, deflector G, and perforated roof or cover, H, in combination with the chimney of the lamp-chamber of a fare-box, for the purpose set forth.

2. A ventilating apparatus for a fare-box lamp-chamber, in which the wall E of chamber F is made higher on one side than the other, as and for the purpose set forth.

3. The combination, with the driver's seat, of a ventilating apparatus, E, of a fare-box lamp-chamber, provided with a guard-frame, I, substantially as and for the purpose set forth.

In testimony that I claim the foregoing, I have hereunto set my hand.

J. B. SLAWSON.

Witnesses:
D. G. STUART,
LEO VAN RISWICK.